United States Patent Office 3,657,299
Patented Apr. 18, 1972

3,657,299
PROCESS FOR PRODUCING TRIETHYL-ALUMINUM
Eiichi Ichiki, Yasuhiko Inoue, Yoshihiro Kondo, and Tadaaki Yako, Niihama, Japan, assignors to Sumitomo Chemical Co., Ltd.
No Drawing. Filed May 4, 1970, Ser. No. 34,588
Claims priority, application Japan, May 6, 1969, 44/34,954
Int. Cl. C07f 5/06
U.S. Cl. 260—448 A
15 Claims

ABSTRACT OF THE DISCLOSURE

The present invention provides an improved process for producing high purity triethylaluminum, which comprises reacting ethylene with an alkylaluminum compound in the presence of a catalyst system comprising (1) a nickel compound and (2) at least one organic compound selected from the group consisting of conjugated diolefins and their oligomers, diallyl ethers and their derivatives, styrene and its derivatives, acrylic acid esters and their derivatives and nitrile compounds.

---

This invention relates to a process for the preparation of triethylaluminum and more particularly to a process for the preparation of high purity triethylaluminum which comprises conducting displacement reaction of ethylene with an alkylaluminum compound in the presence of a novel catalyst system.

It is known to synthesize triethylaluminum by the displacement reaction of ethylene with triisobutylaluminum (K. Ziegler et al. U.S. Pat. No. 2,835,689 (1958)).

However, according to such known process, there are occurred a growth reaction wherein triethylaluminum produced by the displacement reaction of ethylene with triisobutylaluminum further reacts with ethylene to become a higher alkylaluminum, therefore triethylaluminum high in the purity can not be obtained and also ethylene is lost thereby.

Further, in such known process, if there exists a straight chain type alkylaluminium such as tri-n-butylaluminum in the starting material triisobutylaluminum, there will be formed triethylaluminum low in the purity because such straight chain type alkylaluminum is very low in reactivity with ethylene so that substantially all of the same would remain unreacted in the resulting triethylaluminum product. Therefore, it is necessary to use triisobutylaluminum of a high purity which does not contain such straight chain type alkyl radical such as n-butyl radical. However, such pure material is difficult in commercial availability and therefore this would cause the production cost high and render the industrial practice disadvantageous.

Further, Ziegler, et al. propose in the above mentioned U.S. patent to conduct the displacement reaction in the presence of nickel, cobalt or platinum. This can give triethylaluminum of a purity considerably higher than by a process without the use of such catalyst. However, the activity of the above catalyst is unstable so that, even if the same amount of the same catalyst is added, the displacement rate does not always show a constant value but fluctuates so much (usually about 45 to 85%). Therefore, it is difficult to carry out the reaction with a high reproductivity and there is a disadvantage that no uniform product is obtained in the industrial production.

Further, even in such catalyst process, if a straight chain type alkylaluminum such as tri-n-butylaluminum co-exists in the starting material triisobutyl aluminum, there will be formed triethylaluminum low in the purity because such straight chain type alkylaluminum is very low in reactivity with ethylene so that considerable amount of the same would remain unreacted in the resulting product. This would again cause such trouble explained hereinbefore.

Therefore, it is a principal object of the present invention to provide a process for the preparation of high purity triethylaluminum.

Another object of the present invention is to provide a novel catalyst which is stable in the activity and gives a high displacement rate in the preparation of triethylaluminum by the displacement reaction of ethylene with and alkylaluminum compound.

A further object of the present invention is to provide a novel and effective catalyst for the displacement reaction of ethylene with a straight chain alkylaluminum compound.

The other objects of this invention will be apparent from the following description.

Briefly, this invention provides a process for producing high purity triethylaluminum which comprises reacting ethylene wth an alkylaluminum compound in the presence of a catalyst system comprising (1) a nickel compound and (2) at least one organic compound selected from the group consisting of conjugate diolefins and their oligomers, diallyl ethers and their derivatives, styrene and its derivatives, acrylic acid esters and ther derivatives and nitrile compounds.

The alkylaluminum compound to be used in the present invention is, for example, tri-n-propylaluminum, ethyldipropylaluminum, tri-n-butylaluminum, triisobutylaluminum, tri-n-heptylaluminum, tri-n-hexylaluminum, 2-methylhexyl-di-n-heptylaluminum, tri-2-ethylhexylaluminum, tri-n-octylaluminum, tri-2-ethyl-4-methylpentylaluminum, tri-n-nonylaluminum, tri-n-decylaluminum or a mixture of any two or more of them.

There may be also used a mixed alkylaluminum compound such as those produced by a reaction, for example, of aluminum with hydrogen and ethylene and containing triethylaluminum, tri-n-butylaluminum, tri-n-hexylaluminum or tri-n-octylaluminum wherein triethylaluminum content is predominant.

However, alkylaluminum compounds wherein the alkyl has no hydrogen atom in the β-position carbon, such as methyl radical or neopentyl radical perform no displacement reaction with ethylene, and therefore they are outside the object of the present invention.

The alkylaluminum compounds to be used as the starting material according to this invention may be prepared by any known process. However, according to the usual process, the product will contain, in addition to trialkylaluminum, some dialkylaluminum hydride. However, if the content of such dialkylaluminum hydride in the starting material alkylaluminum compound is high, the catalytic effect would tend to reduce. Therefore, it is preferable to alkylaluminum compound in which the content of the dialkylaluminum hydride is less than about 6% in the equivalent percentage of Al—H (wherein "Al" represents the amount of the gram atom of aluminum in the bonded state). That is to say, it is preferable to use the alkylaluminum containing more than 94% in equivalent percentage of trialkylaluminum. However, even with alkylaluminum compound containing more than about 6% Al—H in the equivalent percentage, a better result is obtained according to the present invention, than those resents the amount of the gram atoms of aluminum in to be obtained by the use of any other known catalyst system. Therefore, the use of such alkylaluminum compound is not excluded from the present invention. However, in such case, it is desirable to chemically add an olefin to the dialkylaluminum hydride by a known process prior to the alkyl radical displacing reaction so that the dialkylaluminum hydride may be converted to a trialkylaluminum and the content of the dialkylaluminum hydride may be reduced. The olefin to be used for this purpose may be the olefin used in the synthesis of the raw material alkylaluminum compound. Alternatively the bond of Al and H can be converted to a bond of Al and —$C_2H_5$ radical by the use of ethylene.

The nickel compounds to be used in the present invention are, for example, inorganic acid salts such as nickel chloride, nickel nitrate, nickel carbonate, etc., organic acid salts such as nickel stearate, nickel naphthenate, etc. Other known nickel compounds such as bisacetylacetonate, biscyclopentadienylnickel, nickel carbonyl or a mixture of any two or more of them.

Generally an organic acid salt of nickel which is capable of forming a uniform solution in the preparation of the catalyst is preferable, while the present invention is not limited to the use thereof.

Generally the nickel compound may be used more than 0.00005% by mol, preferably 0.0005 to 0.05% by mol based on the mol of alkylaluminum compound, although a smaller amount is also effective. On the other hand, a larger amount beyond 0.5 mol percent is not harmful but is not significant in view of the economical point.

The organic compound to be used together with the nickel compound in accordance with the present invention is one or more of compounds selected from the group consisting of conjugate diolefins and their oligomers, diallyl ethers and their derivatives, styrene and its derivatives, acrylic acid esters and their derivatives and nitrile compounds.

These organic compounds are, for example, noncyclic conjugate diolefins such as butadiene, isoprene, chloroprene, etc., cyclic oligomers such as cyclooctadiene, 1,5; 4-vinylcyclohexene-1; 1,5-dimethylcyclooctadiene-1,5; cyclododecatriene-1,5,9, etc., chain oligomers such as 3-methylheptatriene-1,4,6; octatriene-1,3,6; dodecatetraene-1,3,6,10, 2,6 - dimethyloctatriene - 1,3,6, etc., diallyl ether derivatives such as diallyl ether, bis-1-methylallyl ether, bis-2-methylallyl ether, bis-3-methylallyl ether, allyl-2-methylally ether, etc., styrene derivatives such as styrene, p-methylstyrene, p-ethylvinylbenzene, p-n-butylvinylbenzene, α-methylstyrene; etc., acrylic acid ester derivatives such as methyl acrylate, ethyl acrylate, n-butyl acrylate, methyl methacrylate, ethyl methacrylate, etc., nitrile compounds such as acrylonitrile, methacrylonitrile, 2-butenenitrile, acetonitrile, etc.

Such organic compound(s) may be used generally in an amount of more than 0.00003% by mol based on the mol of alkylaluminum compound. If the amount is smaller than the above, substantially no effect would be recognized. On the other hand, if the amount is too large, though there is no disadvantage to the effect, the purity of the produced triethylaluminum would be reduced. Therefore it is preferable to employ such organic compound in an amount of 0.0003 to 1.0% by mol based on the mol of alkylaluminum compound.

The working mechanism of the catalyst of the present invention comprising of a nickel compound and an organic compound has not yet been fully ascertained. However, it is presumed that the catalyst exhibits such excellent effect because the nickel atom and organic compound would produce a coordination compound in the presence of the alkylaluminum compound and ethylene and this coordination compound has more active sites than in other known catalysts such as nickel. Thus it is considered that the nickel atom and organic compound form a coordination compound at a simple mol ratio between 2:1 and 1:2.

The temperature for conducting the displacement reaction of ethylene with an alkylaluminum compound in the presence of the catalyst of the present invention is 0 to 160° C., preferably 50 to 80° C. At a temperature higher than the above, the activity of the catalyst would tend to quickly reduce. Further, when the temperature is lower than 0° C., the reaction velocity would reduce remarkably.

The reaction pressure to be used is above the atmospheric pressure, preferably 5 to 100 atmospheres. Even if the pressure is high, no particular problem is caused to the reaction itself. Therefore, the pressure may be determined depending on the pressure-resistance of the reactor to be used. Further, when the reaction pressure is below the atmospheric pressure, the reaction velocity would be remarkably reduced. Therefore, generally the reaction is carried out above the atmospheric pressure.

The addition of the nickel compound and organic compound to the reaction system may be conducted in any suitable manner. However, it is preferable that the nickel compound and organic compound are uniformly dispersed or dissolved in such organic medium which is chemically inert to the alkyl aluminum compound and ethylene and can uniformly disperse or dissolve the nickel compound as, for example, heptane, benzene or fluid paraffin or a higher olefin liberated by the reaction of ethylene with the alkylaluminum compound, and then the solution or dispersion is added to the reaction system of the alkylaluminum compound and ethylene. However, it is also possible that a solution or dispersion of the nickel compound and organic compound is prepared by the above mentioned method, and then this catalyst solution or dispersion is mixed outside the reaction system with the raw material alkylaluminum compound at a predetermined rate and then the mixture is introduced into the reaction system to react with ethylene. Alternatively, the nickel compound and organic compound may be separately added to the reaction system.

The displacement reaction may be carried out in the presence or absence of a solvent inert to the catalyst, alkylaluminum compound and ethylene, for example, benzene, heptane or fluid paraffin.

The reaction can be carried out by any of batch, semicontinuous and continuous processes. It is desirable, however, to carry out the same by a continuous process. Particularly, there is obtained an optimum result when the reaction is carried out by a continuous process wherein a packed tower and shelf tower type reactor are used, the alkylaluminum compound and catalyst are caused to flow down in a liquid state from the upper part of the reactor and the ethylene is introduced in a gaseous state from the lower part of the reactor.

The resulting reaction product (triethylaluminum) contains the catalyst and free olefin. For some uses the said product may be used as such without any further treatment. However, if necessary, the catalyst and free olefin may be separated in any suitable manner.

By the use of the above catalyst according to the present invention, there are obtained various advantages such as are described below.

Thus, according to this invention, triethylaluminum of a purity higher than of triethylaluminum hitherto commercially available can be easily produced. Further, it is difficult with a known conventional catalyst to obtain an always stabilized result. For example, even with bisacetylacetonatonickel, the conversion to triethylaluminum fluctuates so much such as from 44 to 86% by mol. In contrast thereto, with the catalyst of the present invention, the reaction is stable so that the conversion is always about 95 to 99% by mol. Further, with a known conventional catalyst, in order to obtain triethylaluminum comparatively high in the purity, it is necessary to use as a raw material only an alkylaluminum compound wherein the alkyl radical is branched in the β-position, such as triisobutylaluminum. But with the use of the catalyst of the present invention there is no such limitation in respect of the starting material. Thus, for example, even an alkylaluminum compound wherein the alkyl radical consists only of a straight chain type alkyl radical having no β-position branching can also be used as a starting material in the present invention. Further, with the catalyst of the present invention, triethylaluminum can be synthesized under very moderate reaction conditions. Further the amount of the catalyst may be smaller than that required in the case of known catalysts.

The invention will be further explained by the following examples which are given for illustration purpose only and not for limiting the invention in any way. In the examples, all the percentages are by mol.

EXAMPLE 1

The atmosphere in an autoclave of a capacity of 1 liter made of stainless steel was replaced by nitrogen gas. Then 50 ml. of a fluid paraffin solution having dissolved therein 37 mg. of nickel naphthenate and 300 mg. of cyclooctadiene-1,5 were charged in the autoclave along with 200 g. of an alkylaluminum consisting of 89% triisobutylaluminum and 11% tri-n-butylaluminum. The mixture was heated to 70° C. and then ethylene was introduced so as to be 60 atmospheres. The mixture was caused to react for 60 minutes while stirring. After the reaction, the product was cooled down to the room temperature. The ethylene gas remaining in the system and butene gas produced during the reaction were removed and the produced alkylaluminum was recovered. The alkylaluminum was decomposed with a 7.5 N NaOH solution and the generated gas was analyzed. As a result, it was confirmed that there was obtained triethylaluminum with a purity of 99%.

For comparison, substantially the same procedure was repeated except that no cyclooctadiene-1,5 was used. The purity of the produced triethylaluminum was 70%.

EXAMPLE 2

The same procedure as in Example 1 was repeated except that 200 mg. of isoprene were used instead of cyclooctadiene-1,5. As a result, there was obtained triethylaluminum with a purity of 97%.

EXAMPLE 3

The same procedure as in Example 1 was repeated except that 260 mg. of chloroprene were used instead of cyclooctadiene-1,5. As a result, there was obtained triethylaluminium with a purity of 98%.

EXAMPLE 4

The atmosphere in a reaction tube of a diameter of 4 cm. and a height of 40 cm. made of iron and provided with an ethylene inlet of a diameter of 1 cm. in the bottom part and a gas outlet of a diameter of 1 cm. in the top part was replaced by nitrogen gas. 7 mg. of nickel chloride were suspended in 10 ml. of fluid paraffin. Then 2 ml. of a liquid obtained by cooling to −10° C. a gaseous mixture consisting of 30% butadiene, 25% isobutylene, 20% butene-1, 8% butene-2, 10% isobutane and 7% butane were added to the suspension. After stirring well the mixture was returned to the room temperature and the gasified portion was removed. Then 200 g. of an alkylaluminum consisting of 27% triisobutylaluminum and 73% tri-n-butylaluminum were added thereto to prepare a mixed solution. The mixed solution was charged into the reaction tube and was heated to 80° C. Then ethylene was introduced to create a pressure of 10 atmospheres in the system. Thereafter, ethylene was introduced at a rate of 1.0 liter (calculated as NTP) per minute. On the other hand, ethylene and free butene were taken out through the gas outlet while keeping the pressure within the system at 10 atmospheres. The reaction was continued for 210 minutes. Then the system was cooled to the room temperature and the ethylene gas remaining in the system and butene liberated during the reaction were removed. The produced alkylaluminum was recovered and analyzed. The purity of triethylaluminum was 99%.

For comparison, the same procedure was repeated except that the mixed liquified gas consisting of butadiene, isobutylene and others was not used. The purity of triethylaluminum was 63%.

EXAMPLE 5

There were charged in the same reaction tube as in Example 4, 200 g. of an alkylaluminum mixture consisting of 57% triethylaluminum, 23% diethylaluminum hydride, 12% tri-n-butylaluminum, 5% tri-n-hexylaluminum and 3% tri-n-octylaluminum, under a nitrogen gas atmosphere After heating to 80° C., ethylene was introduced to make the pressure within the system 10 atmospheres. The system was kept at this temperature under this pressure for 60 minutes to convert the diethylaluminum hydride to triethylaluminum. A catalyst solution prepared by dissolving 13 mg. of nickel bisacetylacetonate in 10 ml. of xylene and further adding 108 mg. of 3-methyl-heptatriene-1,4,6 there to was introduced into the reaction tube under pressure and then ethylene was introduced at a rate of 1.0 liter (calculated as NTP) per minute. The ethylene and liberated gas were taken out through the gas outlet while keeping the pressure in the system constant at 10 atmospheres. The reaction was carried out for 210 minutes. Then the system was cooled to the room temperature, and the ethylene gas and liberated gas remaining in the system were removed and further the liberated gas was removed under a reduced pressure of 1 mm. Hg. The produced alkylaluminum was recovered and analyzed. The purity of triethylaluminum was 99%.

For comparison, the same procedure was repeated except that 3-methylheptatriene-1,4,6 was not used. The purity of the produced triethylaluminum was 65%.

EXAMPLE 6

There was charged in the same reaction tube as in Example 4 a mixed solution prepared by dissolving 10 ml. of hexane in 37 mg. of nickel naphthenate, adding 108 mg. of 3-methylheptatriene-1,4,6 to the solution and further adding 200 g. of an alkylaluminum consisting of 29% triisobutylaluminum, 55% tri-n-butylaluminum, 11% tris-2-ethylhexylaluminum and 5% tris-2-ethylpentylaluminum into the solution while slowly stirring. Then the reaction was carried out in the same manner as in Example 4. Then the system was cooled to the room temperature and the ethylene and olefin remaining in the system were removed. Upon analysis, it was observed that the purity of produced triethylaluminum was 99%.

EXAMPLE 7

The same procedure as in Example 6 was repeated except that 108 mg. of 4-vinylcyclohexene-1 were used instead of 3-methylheptatriene-1,4,6. The purity of the produced triethylaluminum was 95%.

EXAMPLE 8

The same procedure as in Example 6 was repeated except that 160 mg. of cyclododecatriene-1,5,9 were used instead of 3-methylheptatriene-1,4,6. The purity of the produced triethylaluminum was 95%.

EXAMPLE 9

The atmosphere in a reaction tube of a diameter of 4 cm. and a height of 40 cm. made of iron and provided with an ethylene inlet of a diameter of 1 cm. in the bottom part and a gas outlet of a diameter of 1 cm. in the top part was replaced by nitrogen gas. A suspension was prepared by suspending 7 mg. of nickel chloride in 10 ml. of fluid paraffin, and thereto were added 128 mg. of bis-2-methylallyl ether. While stirring the mixture there were added 200 g. of an alkylaluminum consisting of 27% triisobutylaluminum and 73% tri-n-butylaluminum. The resulting suspension was charged in the reaction tube and heated to 80° C. Then ethylene was introduced into the reaction tube through the ethylene inlet to make the pressure in the system 10 atmospheres. Thereafter, ethylene was introduced into the system at a rate of 1.0 liter (calculated as NTP) per minute. While keeping the pressure in the system at 10 atmospheres, ethylene and liberated butene were taken out. After introducing ethylene for 210 minutes, the system was cooled to the room temperature, and ethylene remaining in the system and butene liberated during the reaction were removed and the produced alkylaluminum was analyzed. The purity of triethylaluminum was 99.0%. Further, for comparison, the same procedure was repeated except that no bis-2-methylallyl ether was used. The purity of triethylaluminum was 63.0%.

EXAMPLE 10

The same procedure as in Example 9 was repeated except that 100 mg. of diallyl ether were used instead of bis-2-methylallyl ether. There was obtained triethylaluminum with a purity of 98%.

EXAMPLE 11

The atmosphere in an autoclave of a capacity of 1 liter made of stainless steel was replaced by nitrogen gas and then there were charged 50 ml. of a fluid paraffin solution having dissolved therein 37 mg. of nickel naphthenate and 400 mg. of p-ethylvinylbenzene and 200 g. of an alkylaluminum consisting of 89% triisobutylaluminum and 11% tri-n-butylaluminum. The mixture was heated to 70° C., and ethylene was introduced so as to be under 60 atmospheres. The reaction was conducted for 60 minutes while stirring. After the reaction, the system was cooled to the room temperature, ethylene gas remaining in the system and butene gas produced during the reaction were removed and the produced triethylaluminum solution was recovered. The produced triethylaluminum was decomposed with an aqueous 7.5 N NaOH solution and the generated gas was analyzed. As a result, it was confirmed that there was obtained triethylaluminum with a purity of 99.0%.

For comparison, the same procedure was repeated except that p-ethylvinylbenzene was not added. The purity of the produced triethylaluminum was 70.0%.

EXAMPLE 12

In the same reaction tube as in Example 9, there were charged 200 g. of an alkylaluminum mixture consisting of 57% triethylaluminum, 23% diethylaluminum hydried, 12% tri-n-butylaluminum, 5% tri-n-hexylaluminum and 3% tri-n-octylaluminum under a nitrogen gas stream. Then the charge was heated to 80° C., and ethylene was introduced to make the pressure in the system 10 atmospheres. The system was kept at this temperature under this pressure for 60 minutes to convert the diethylaluminum hydride to triethylaluminum. Then a solution prepared by dissolving 13 mg. of bisacetylacetonated nickel in 10 ml. of xylene and adding 85 mg. of methyl acrylate thereto was introduced into the reaction tube under pressure, and ethylene was then introduced at a rate of 1.0 liter (calculated at NTP) per minute. Ethylene and liberated gas were taken out through the gas outlet while keeping the pressure in the system at 10 atmospheres. After ethylene was introduced for 210 minutes, the system was cooled to the room temperature, the ethylene gas and liberated gas remaining in the system were removed and further the liberated gas was separated under a reduced pressure of 1 mm. Hg. The produced alkylaluminum was analyzed, and found that the purity was 98%.

For comparison, the same procedure was repeated except that no methyl acrylate was added. The purity of resulting triethylaluminum was 65%.

EXAMPLE 13

The same procedure as in Example 12 was repeated except that 99 mg. of diallyl ether were used instead of methyl acrylate. There was obtained triethylaluminum with a purity of 99%.

EXAMPLE 14

While a solution prepared by dissolving 37 mg. of nickel naphthenate in 10 ml. of heptane and adding 98 mg. of diallyl ether thereto was being slowly stirred, 200 g. of an alkylaluminum mixture consisting of 29% triisobutylaluminum, 55% tri-n-butylaluminum, 11% tris-2-ethylhexylaluminum and 5% tris-2-ethyl-4-methylpentylaluminum were added to prepare a mixed solution. The mixture was allowed to react in a reaction tube made of iron under the same conditions as in Example 9. After the reaction, the product was cooled to the room temperature. Then ethylene and liberated olefin remaining in the system were removed and the produced alkylaluminum was analyzed. The purity of triethylaluminum was 98%.

For comparison, the same procedure was repeated without adding diallyl ether. The purity of triethylaluminum thus prepared was 41%.

EXAMPLE 15

The same procedure as in Example 14 was repeated except that 104 mg. of styrene were used instead of diallyl ether. There was obtained triethylaluminum with a purity of 96%.

EXAMPLE 16

The same procedure as in Example 14 was repeated except that 100 mg. of methyl methacrylate were used instead of diallyl ether. There was obtained triethylaluminum with a purity of 96%.

EXAMPLE 17

The same procedure as in Example 14 was repeated except that 53 mg. of acrylonitrile were used instead of diallyl ether. There was obtained triethylaluminum with a purity of 99%.

EXAMPLE 18

The same procedure as in Example 14 was repeated except that 41 mg. of acetonitrile were used instead of diallyl ether. There was obtained triethylaluminum with a purity of 95%.

What we claim is:

1. A process for producing high purity triethylaluminum, which comprises reacting ethylene with an alkylaluminum compound in the presence of a catalyst system comprising (1) a nickel compound and (2) at least one organic compound selected from the group consisting of conjugated diolefins and their oligomers, diallyl ethers, styrene and alkyl-substituted styrene alkyl acrylates or methacrylates and nitriles, wherein said nickel compound and said organic compound are used in an amount of more than 0.00005% by mol and an amount of more than 0.00003% by mol, based on the mols of alkylaluminum compound, respectively.

2. A process according to claim 1 wherein said alkylaluminum is tri-n-propylaluminum ethyldipropylaluminum, tri-n-butylaluminum, triisobutylaluminum, tri-n-heptylaluminum, tri-n-hexylaluminum, 2-methylhexyl-di-n-heptylaluminum, tri-2-ethylhexylaluminum, tri-n-octylaluminum, tri-2-ethyl-4-methylpentylaluminum, tri-n-nonylaluminum, tri-n-decylaluminum or a mixture of any two or more of them.

3. A process according to claim 1 wherein said nickel compound is nickel chloride, nickel nitrate, nickel carbonate, nickel stearate, nickel naphthenate, bisacetylacetonato nickel, biscyclopentadienyl nickel or nickel carbonyl or a mixture of any two or more of them.

4. A process according to claim 1 wherein said organic compound is butadiene, isoprene, chloroprene, cyclooctadiene-1,5, 4-vinylcyclohexene-1, 1,5-dimethylcyclooctadiene-1,5, cyclododecatriene-1,5,9, 3-methylheptatriene-1,4,6, octatriene-1,3,6, dodecatetraene-1,3,6,10 or 2,6-dimethyloctatriene-1,3,6.

5. A process according to claim 1 wherein said organic compound is diallyl ether, bis-1-methylallyl ether, bis-2- methylallyl ether, bis-3-methylallyl ether or allyl-2-methylallyl ether.

6. A process according to claim 1 wherein said organic compound is styrene, p-methylstyrene, p-ethylvinylbenzene, p-n-butylvinylbenzene or α-methylstyrene.

7. A process according to claim 1 wherein said organic compound is methyl acrylate, ethyl acrylate, n-butyl acrylate, methyl methacrylate or ethyl methacrylate.

8. A process according to claim 1 wherein said organic compound is acrylonitrile, methacrylonitrile, 2-butenenitrile or acetonitrile.

9. A process according to claim 1 wherein said nickel compound is used in an amount of 0.0005 to 0.05% by mol based on the mol of alkylaluminum compound.

10. A process according to claim 1 wherein said organic compound is used in an amount of 0.003 to 1.0% by mol based on the mol of alkylaluminum compound.

11. A process according to claim 1 wherein said reaction is carried out at 0 to 160° C.

12. A process according to claim 1 wherein said reaction is carried out at 50 to 80° C.

13. A process according to claim 1 wherein said reaction is carried out above the atmospheric pressure.

14. A process according to claim 1 wherein said reaction is carried out under 5 to 100 atmospheres.

15. A process according to claim 1 wherein the alkylaluminum compound contains more than 94% in equivalent percentage of trialkylaluminum.

References Cited

UNITED STATES PATENTS 2,781,410   2/1957   Ziegler et al. ____ 260—683.15 D
2,978,523   4/1961   Coyne et al. ____ 260—683.15 D TOBIAS E. LEVOW, Primary Examiner H. M. S. SNEED, Assistant Examiner